012# United States Patent

[11] 3,619,398

| [72] | Inventors | Joseph F. Bosso<br>Lower Burrell, Pa.;<br>Gerald R. Gacesa, Franklin, Wis. |
|---|---|---|
| [21] | Appl. No. | 772,353 |
| [22] | Filed | Oct. 31, 1968 |
| [45] | Patented | Nov. 9, 1971 |
| [73] | Assignee | PPG Industries, Inc.<br>Pittsburgh, Pa. |

[54] ELECTRODEPOSITION PROCESS
8 Claims, No Drawings

[52] U.S. Cl. .................................................. 204/181
[51] Int. Cl. .................................................. B01k 5/00
[50] Field of Search .................................................. 204/181

[56] References Cited
UNITED STATES PATENTS

| 3,301,804 | 1/1967 | Zora et al. .................... | 260/29.2 EP |
| 3,410,773 | 11/1968 | Hagan et al. .................... | 204/181 |
| 3,450,655 | 6/1969 | Spiller .......................... | 204/181 |
| 3,455,805 | 7/1969 | Smith et al. .................... | 204/181 |
| 3,468,779 | 9/1969 | Slater et al. .................... | 204/181 |

*Primary Examiner*—Daniel E. Wyman
*Assistant Examiner*—W. Cannon
*Attorney*—Chisholm and Spencer ABSTRACT: A method of applying coatings by electrodeposition utilizing a water-dispersed composition in which the major resinuous component is a reaction product of a polyepoxide and a boron ester substituted with an amino group. These compositions deposit on the cathode and provide coatings of improved properties, including a high degree of corrosion resistance.

ELECTRODEPOSITION PROCESS

BACKGROUND OF THE INVENTION

Electrodeposition, although known for some time, has only recently become of commercial importance as a coating application method. Along with the increased use of such methods has been the development of certain compositions which can provide satisfactory coatings when applied in this manner. While many compositions can be electrodeposited, most coating compositions when applied using electrodeposition techniques do not produce commercially usable coatings. Moreover, electrodeposition of many coating materials, even when otherwise successful, is often attended by various disadvantages such as nonuniform coatings and by poor throwing power. In addition, the coatings obtained are in most instances deficient in certain properties essential for their utilization in many applications for which electrodeposition is otherwise suited. In particular, properties such as corrosion resistance and alkali resistance, are difficult to achieve, especially with the resins which are usually employed in electrodeposition processes. Other problems include a tendency for the deposited coating to stain or discolor, attributed to chemical changes and interactions. The conventional electrodeposition vehicles utilized heretofore contain polycarboxylic acid resins neutralized with a base; these deposit on the anode and because of their acidic nature tend to be sensitive to common types of corrosive attack, e.g., by salt, alkali, etc.

BRIEF SUMMARY OF THE INVENTION

It has now been found that reaction products of polyepoxides and a boron ester substituted with at least one amino group when dispersed in water and electrodeposited provide adherent coatings which are deposited on the cathode and which have excellent properties, including outstanding corrosion resistance. These reaction products form the major resinous component of the coating compositions, either as the sole resinous constituent or in combination with one or more other resinous or film-forming materials. Among the properties of the coatings herein are the desirable properties ordinarily associated with the electrodepositable resins known heretofore and, in addition, these reaction products provide coatings of unique advantages and properties, such as increased resistance to salt-spray, alkali, and similarly corrosive elements.

The compositions employed in the invention herein are made by reacting a polyepoxide having a 1,2-epoxy equivalency greater than 1.0 with a boron ester substituted with at least one amino group, and dispersing the reaction product obtained in water.

DETAILED DESCRIPTION OF THE INVENTION

The reaction products employed in the present invention are produced from a polyepoxide and an amino-substituted boron ester.

The polyepoxide employed can be any epoxide compound or mixture which has a 1,2-epoxy equivalency of greater than 1.0, that is, in which the average number of 1,2-epoxy groups per molecule is greater than 1. The average number of epoxy groups need not be a whole number and in general is less than 4.0. These polyepoxides comprise a relatively large class of materials and have been described in numerous patents. Some of these patents are U.S. Pat. Nos. 2,467,171; 2,615,007; 2,716,123; 3,030,336; 3,053,855; and 3,075,999.

Among the polyepoxides which can be used herein are the polyglycidyl ethers of polyphenols, such as Bisphenol A. These may be attained, for example, by etherification of a polyphenol with epichlorohydrin or dichlorohydrin in the presence of an alkali. The phenolic compound may be bis(4-hydroxyphenyl)-2,2-propane, 4,4'-dihydroxybenzophenone, bis(4-hydroxyphenyl)1,1-isobutane, bis(4-hydroxytertiarybutylphenyl)2,2-propane, bis(2-hydroxynaphthyl)-methane, 1,5-dihydroxynaphthalene, or the like. The polyphenol can also be a novolak resin or a similar polyphenol resin.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides and higher epoxides, as well as mixtures of epoxides comprising in part one or more monoepoxides. These polyepoxides are nonphenolic and are obtained by epoxidation of alicyclic olefins, for example, by oxygen and selected metal catalysts, by perbenzoic acid, by acetaldehyde monoperacetate, or by peracetic acid.

The boron ester component utilized in producing the reaction products employed herein can be any triorganoborate in which at least one of the organic groups is substituted with an amino group. Structurally such esters are esters of boric acid, although not necessarily produced from boric acid; they have the general formula

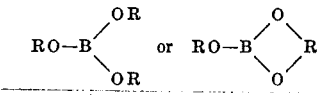

where the R groups are the same or different organic groups, which can be virtually any organic group, such as hydrocarbon or substituted hydrocarbon, usually having not more than 20 carbon atoms and preferably not more than about 8 carbon atoms. The preferred esters have alkyl groups or polyoxyalkyl groups. At least one of the organic groups contains an amino group i.e., a group of the structure;

where $R_1$ and $R_2$ are hydrogen or, preferably, methyl, ethyl or other lower alkyl groups, but can be essentially any other organic radical, so long as they do not interfere with the desired reaction. The nature of the particular groups is less important than the presence of an amino nitrogen atom, and thus higher alkyl, aryl, alkaryl, aralkyl and substituted groups of these types can be present. Esters containing primary amino groups (where $R_1$ and $R_2$ are both hydrogen) can be used but are less desirable than esters containing a secondary or tertiary-amino group.

The preferred boron esters correspond to the formula:

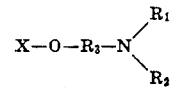

where X has the structure:

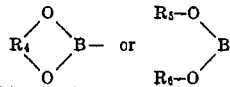

$R_3$ and $R_4$ being divalent organic radicals, such as alkylene or substituted-alkylene, e.g., oxyalkylene or poly(oxyalkylene), or, less desirably, arylene, alkarylene or substituted arylene. $R_5$ and $R_6$ can be alkyl, substituted alkyl, aryl, alkaryl, or other residue from essentially any monohydroxy alcohol derived by removal of the hydroxyl group. $R_5$ and $R_6$ can be the same or different.

Examples of boron esters within the above classes include 2-(beta-dimethylaminoisopropoxy)-4,5-dimethyl-1,3,2-dioxaborolane 2-(beta-diethylaminoethoxy)-4,4,6-trimethyl-1,3,2-dioxaborinane
2-(beta-dimethylaminoethoxy)-4,4,6-trimethyl-1,3,2,-dioxaborinane
2-(beta-diisopropylaminoethoxy)-1,3,2-dioxaborolane
2-(beta-dibutylaminoethoxy)-4-methyl-1,3,2-dioxaborinane
2-(beta-diethylaminoethoxy)-1,3,2,-dioxaborepane
2-(gamma-aminopropoxy)-4-methyl-1,3,2-dioxaborinane
2-(beta-methylaminoethoxy)-4,4,6-trimethyl-1,3,2-dioxaborinane
2-(beta-ethylaminoethoxy)-1,3,6-trioxa-2-boracyclooctane
2-(beta-dimethylaminoethoxy)-1,3,6-trioxa-2-boracyclooctane
2-(gamma-dimethylaminopropoxy)-1,3,6,9-tetraoxa-2-boracycloundecane
2-(beta-dimethylaminoethoxy)-4-(4-hydroxybutyl)-1,3,2-dioxaborinane A number of such boron esters are known; many are described, for example, in U.S. Pat. Nos. 3,301,804 and 3,257,442. They can be prepared by reacting one mole of boric acid (or equivalent boric oxide) with at least 3 moles of alcohol, at least one mole of the alcohol being an amino-substituted alcohol. The reaction is ordinarily carried out by refluxing the reactants with removal of the water formed.

The boron ester and the polyepoxide are reacted by admixing the components, usually at moderately elevated temperatures such as 70° to 110° C. A solvent is not necessary although one is often used in order to afford better control of the reaction; aromatic hydrocarbons or monoalkyl ethers of ethylene glycol are suitable solvents. The proportions of the boron ester and the polyepoxide can be varied and the optimum proportions depend upon the particular reactants. Ordinarily, however, from about 1 part to about 50 parts by weight of the boron ester per 100 parts of the polyepoxide is employed; the proportions are usually chosen with reference to the amount of nitrogen, which is typically from about 0.05 to about 10 percent, based on the total weight of the boron ester and the polyepoxide. Preferably, there are utilized from about 3 parts to about 30 parts of boron ester per 100 parts of polyepoxide or from about 0.1 to about 3 weight percent of nitrogen.

The particular reactants, proportions and reaction conditions should be chosen, in accordance with considerations well known to those in the art, so as to avoid gellation of the product during the reaction. For example, highly functional reactants should be avoided in combination, and excessively severe reaction conditions should not be employed. Similarly, boron esters having reactive substituents should not be utilized along with polyepoxides with which those substituents might react adversely.

The exact structure of the reaction product is not fully understood; however, it is known that the reaction product contains both boron and nitrogen. While the product is probably cross-linked to some extent, it remains soluble in certain organic solvents and can be further cured to a hard, thermoset state.

Coating compositions suitable for electrodeposition comprising the above modified products are made by dispersing the reaction product in water. Depending upon the nature of the reaction product, the dispersions obtained may have the resinous product at least partially dissolved, but even where emulsions are obtained, as is usually the case, the emulsions are very stable and have an indefinite shelf life without phase separation. It is not necessary to add a neutralizing agent to the product in order to obtain a suitable dispersion.

The concentration of the product in water depends upon the process parameters to be used and is in general not critical, but ordinarily, the major proportion of the dispersed composition is water, e.g., the composition may contain 1 to 25 percent by weight of resin. In most instances a pigment composition and, if desired, various additives such as antioxidants, surface active agents and the like are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow and the like.

In electrodeposition processes employing the water-dispersed coating compositions described above, the aqueous coating composition is placed in contact with an electrically conductive anode and an electrically conductive cathode, with the surface to be coated being the cathode. Upon the passage of electric current between the anode and the cathode, while in contact with the bath containing the coating composition, an adherent film of the coating composition is deposited on the cathode. This is directly contrary to processes utilizing polycarboxylic acid resins, as in the prior art, and a number of advantages are attributed to this cathodic deposition. For example, coatings obtained in accordance with the invention have a surprisingly high degree of corrosion resistance.

The conditions under which the electrodeposition is carried out are in general similar to those used in electrodeposition of other types of coatings. The applied voltage may be varied greatly and can be, for example, as low as 1 volt or as high as several thousand volts, although typically between 50 volts and 500 volts. The current density is usually between about 1.0 ampere and 15 amperes per square foot, and tends to decrease during the electrodeposition.

The method of the invention is applicable to the coating of any conductive substrate, and especially metals such as steel, aluminum, copper or the like.

After deposition, the coating is cured, usually by baking at elevated temperatures. Temperatures of 250° F. to 500° F. for 1 to 30 minutes are typical baking schedules utilized.

Illustrating the invention are the following examples, which, however, are not to be construed as limiting the invention to their details. All parts and percentages in the examples, as well as throughout this specification are by weight unless otherwise specified.

EXAMPLE 1

A reaction vessel was charged with 500 parts of polyepoxide made from the reaction of epichlorohydrin and Bisphenol A, having an epoxide equivalent of 290 to 335 and a molecular weight of 580–670 (Epon 836). The polyepoxide was heated to 70° C. with stirring and then 45 parts of 2-(beta-dimethylaminoethoxy)-4-methyl-1,3,2-dioxaborinane were added over a 20 minute period, during which time the temperature rose to 98° C. After 3 minutes there were added 825 parts of water over a 40 minute period while continuing stirring. There was obtained a milky white emulsion having a nonvolatile solids content of 40 percent and a pH of 9.5. This emulsion was reduced with water to 10 percent nonvolatile solids content and electrodeposited using phosphated steel electrodes and the following conditions:

| | |
|---|---|
| Bath temperature | 80° F. |
| pH | 9.5 |
| Deposition time 90 seconds | |
| Voltage | 100 volts |
| Current | 1.0–0.08 amp. 1 |

There was obtained an adherent coating on the cathode which was then baked at 325° F. for 20 minutes. The cured coating was clear, smooth and adherent, having a thickness of 1–2.5 mils and a pencil hardness of 3H. It was highly resistant to acetone and had excellent salt-spray and alkali resistance.

EXAMPLE 2

Example 1 was repeated except that the cathode employed was aluminum. Similar results were obtained; the coating deposited had good adhesion to the aluminum and other satisfactory properties.

EXAMPLES 3-5

Using procedures similar to that in example 1, reaction products were produced using several polyepoxides produced from epichlorohydrin and Bisphenol A, having varying epoxide equivalents and molecular weights. These were as follows:

| Example | Epoxy | Epoxide Equivalent | Molecular Weight |
|---|---|---|---|
| 3 | Epon 828 | 175–210 | 350–420 |
| 4 | Epon 834 | 225–290 | 450–580 |
| 5 | Epon 1001 | 450–525 | 900–1050 |

Stable emulsions were obtained which when electrodeposited as in example 1 produced adherent coatings on the cathode. The coatings had good properties and appearance, except that the coating from example 5 was somewhat rough.

EXAMPLE 6

A black pigmented coating composition was produced by grinding the following in a steel ball mill:

| | Parts by Weight |
|---|---|
| Emulsion of Example 1 (40 percent solids) | 100 |
| Carbon Black ("Permanox") | 200 |
| Deionized water | 30 |

The coating composition was made by blending 79.2 parts of the above pigment dispersion with 578 parts of the emulsion produced as in example 1 (40 percent solids) and sufficient water to make the total solids content 8 percent. This composition when electrodeposited and cured as in example 1, produced a hard, black glossy coating on the cathode. The pigmented composition was quite stable; after 1 month stirring in an open container it still produced good results.

EXAMPLE 7

Following the procedure of example 1, a reaction product is obtained and electrodeposited using a boron ester produced from 1 mole of $B_2O_3$, 2 moles of diethyleneglycol and 2 moles of dimethylethanolamine; the ester was understood to be 2-beta-dimethylaminoethoxy)-1,3,6-trioxa-2-boracyclooctane, having the structure:

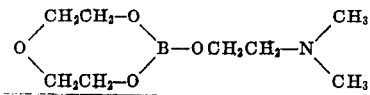

A thermosetting coating of good properties is obtained.

EXAMPLE 8

Following the procedure of example 1, a reaction product is obtained and electrodeposited using a boron ester produced from 1 mole of $B_2O_3$, 2 moles of dimethylethanolamine and 2 moles of triethylene glycol. The boron ester was understood to be 2-(beta-dimethylaminoethoxy)-1,3,6,9tetraoxy-2-boracycloundecane, having the structure:

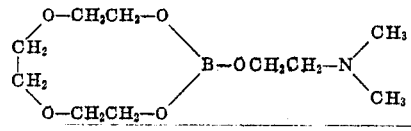

A thermosetting coating of good properties is obtained.

EXAMPLE 9

Following the procedure of example 1, a reaction product is obtained and electrodeposited using a boron ester produced from 2 moles of dimethylethanolamine and 4 moles of n-hexanol per mole of $B_2O_3$. The boron ester was understood to be beta-dimethylaminoethyl-di-n-hexyl borate, having the structure:

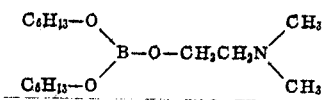

A thermosetting coating of good properties is obtained.

EXAMPLE 10

Following the procedure of example 1, a reaction product is produced using a boron ester made from 1 mole of boron oxide, 2 moles of dimethylethanolamine and 2 moles of 1,2,6-hexanetriol. It was considered to be a mixture of boron esters of the structure:

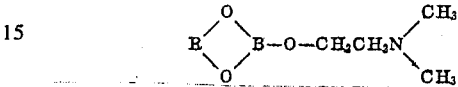

where R is

or

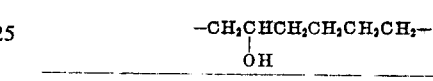

The electrodeposited coating was thermosetting and had good properties.

EXAMPLE 11

Following the procedure of example 1, a reaction product is produced and electrodeposited using a boron ester made from 3 moles of 1,3-butanediol, 3 moles of 2-ethylaminoethanol and 1.5 moles of $B_2O_3$. The boron ester was understood to be 2-(beta-ethylaminoethoxy)-4-methyl-1,3,2-dioxaborinane, having the structure:

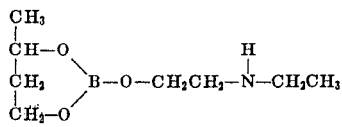

A thermosetting coating of good properties is obtained.

EXAMPLE 12

Following the procedure of example 1, a reaction product is produced and electrodeposited, the boron ester being made from 2 moles of 1,3-butanediol and 2 moles of 3-amino-1-propanol per mole of $B_2O_3$. The boron was understood to have the structure:

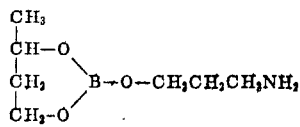

The electrodeposited coating was thermosetting and had good properties.

EXAMPLE 13

Following the procedure of example 1, there is obtained a reaction product from a boron ester made from 2 moles of boric acid, 2 moles of neopentyl glycol, 2 moles of glycolic acid and 3 moles of dimethylethanolamine; the boron ester was understood to have the structure:

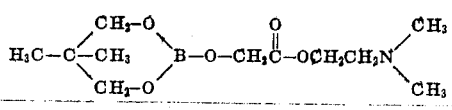

Electrodeposition as above provides thermosetting coatings of good properties.

Other reaction products which can be utilized in the foregoing invention are produced using other polyepoxides and boron esters as described above. For instance, among the polyepoxides of varying types which can be employed are epoxidized novolac resins, such as reaction products of epichlorohydrin with thermoplastic acid-catalyzed phenol-formaldehyde condensate, e.g. the epoxy resin sold as Kopox 357, epoxidized cycloaliphatic compounds, such as 3,4-epoxycyclohexylmethyl-3,4-epoxycyclohexane carboxylate; and nitrogen-containing polyepoxides, such as described in U.S. Pat. Nos. 3,391,097, 3,310,528 and 3,365,471.

Similarly, other conditions can be employed for the electrodeposition process and other pigments, additives and the like can be included in the coating composition as desired.

According to the provisions of the patent statutes, there are described above the invention and what are now considered to be its best embodiments. However, within the scope of the appended claims, it is to be understood that the invention can be practiced otherwise than as specifically described.

We claim:

1. A method of coating an electrically conductive substrate which comprises passing electric current between an anode and a cathode in contact with a water-dispersed composition in which the major resinous component is an ungelled reaction product of
   A. a polyepoxide having a 1,2-epoxy equivalency of greater than 1.0 and
   B. a triorganoborate substituted with at least one amino group;

whereby an adherent coating of said composition is deposited on the cathode.

2. The method of claim 1 in which said triorganoborate has the formula

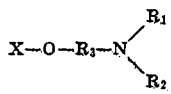

in which X has the structure

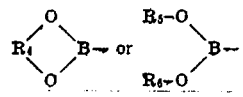

where $R_1$ and $R_2$ are hydrogen or lower alkyl, $R_3$ and $R_4$ are divalent organic groups and $R_5$ and $R_6$ are residues derived by removal of the hydrogen groups from monohydric alcohols.

3. The method of claim 2 in which at least one of the groups represented by $R_1$ and $R_2$ is lower alkyl.

4. The method of claim 1 in which said triorganoborate has the formula

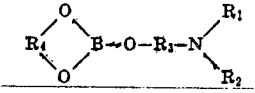

where $R_1$ is lower alkyl and $R_2$ is hydrogen or lower alkyl, and $R_3$ and $R_4$ are each alkylene or oxyalkylene.

5. The method of claim 1 in which said triorganoborate has the structure:

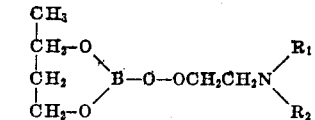

where $R_1$ is lower alkyl and $R_2$ is hydrogen or lower alkyl.

6. The method of claim 1 in which said triorganoborate has the structure

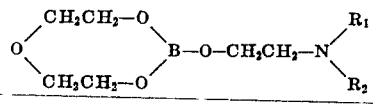

where $R_1$ is lower alkyl and $R_2$ is hydrogen or lower alkyl.

7. The method of claim 1 in which said polyepoxide is a reaction product of epichlorohydrin and bis(4-hydroxyphenyl)2,2-propane.

8. The method of claim 1 in which said polyepoxide is an epoxidized novolak resin.